United States Patent
Eskelinen

(10) Patent No.: US 8,052,844 B2
(45) Date of Patent: Nov. 8, 2011

(54) BLADE, STRUCTURAL COMPONENTS OF A BLADE, AND METHOD FOR MANUFACTURING A BLADE AND THE STRUCTURAL COMPONENTS OF A BLADE

(75) Inventor: Ilkka Eskelinen, Jyskä (FI)

(73) Assignee: Exel Oyj, Vantaa (FI)

( * ) Notice: Subject to any disclaimer, the term of this patent is extended or adjusted under 35 U.S.C. 154(b) by 506 days.

(21) Appl. No.: 11/992,679

(22) PCT Filed: Sep. 26, 2006

(86) PCT No.: PCT/FI2006/050410
§ 371 (c)(1),
(2), (4) Date: Jun. 2, 2008

(87) PCT Pub. No.: WO2007/036606
PCT Pub. Date: Apr. 5, 2007

(65) Prior Publication Data
US 2008/0235960 A1    Oct. 2, 2008

(30) Foreign Application Priority Data
Sep. 28, 2005 (FI) .................... 20055519

(51) Int. Cl.
*B31F 1/12* (2006.01)
(52) U.S. Cl. .................................... 162/281
(58) Field of Classification Search .......... 162/280, 162/281; 15/256.51; 30/357; 428/323, 368; 427/372.2, 547, 532; 264/136, 137; 118/414, 118/110
See application file for complete search history.

(56) References Cited

U.S. PATENT DOCUMENTS

| 4,549,933 | A | * | 10/1985 | Judd et al. .................... 162/281 |
| 5,935,508 | A | * | 8/1999 | Fernyhough et al. ......... 264/495 |
| 6,416,843 | B1 | * | 7/2002 | Rata et al. .................... 428/119 |
| 2002/0055314 | A1 | | 5/2002 | Preisler et al. |
| 2005/0025948 | A1 | * | 2/2005 | Johnson et al. ............... 428/223 |
| 2005/0064214 | A1 | | 3/2005 | Stigenberg et al. |
| 2005/0279478 | A1 | * | 12/2005 | Draper et al. ................. 162/280 |

FOREIGN PATENT DOCUMENTS

| EP | 1 123 751 A1 | 8/2001 |
| WO | 99/12726 * | 3/1999 |
| WO | WO-99/54520 A1 | 10/1999 |
| WO | 99/64674 * | 12/1999 |
| WO | WO-02/35002 A1 | 5/2002 |

* cited by examiner

*Primary Examiner* — Mark Halpern
(74) *Attorney, Agent, or Firm* — Birch, Stewart, Kolasch & Birch, LLP

(57) ABSTRACT

The invention concerns a method for manufacturing a blade (10), in which at least the composite base structure (15) of the blade (10) is manufactured in a pultrusion process (20) by pulling fibers (11) through at least an impregnation stage (12) and a curing stage (14), the base structure (15) is equipped with at least one wear area (16.1, 16.2), and the said blade (10) is detached from a blade blank (22) formed of a base structure (15) and a wear area (16.1, 16.2). The wear area of the blade (10) is formed of an edge-structure part (16.1, 16.2) protruding out side the edge of the base structure (15). In addition, the invention also concerns a corresponding blade and part components for manufacturing a blade according to the invention.

10 Claims, 4 Drawing Sheets

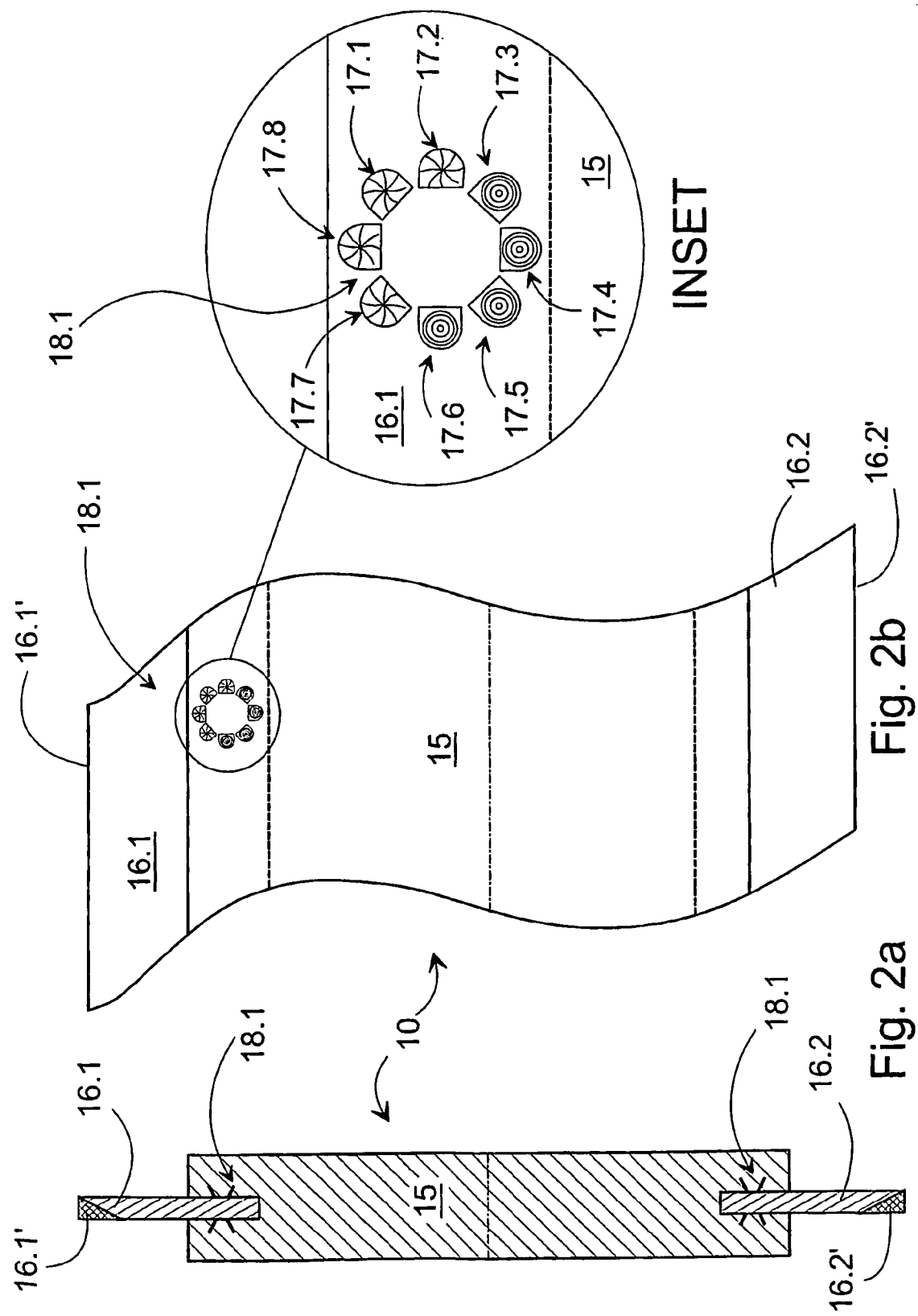

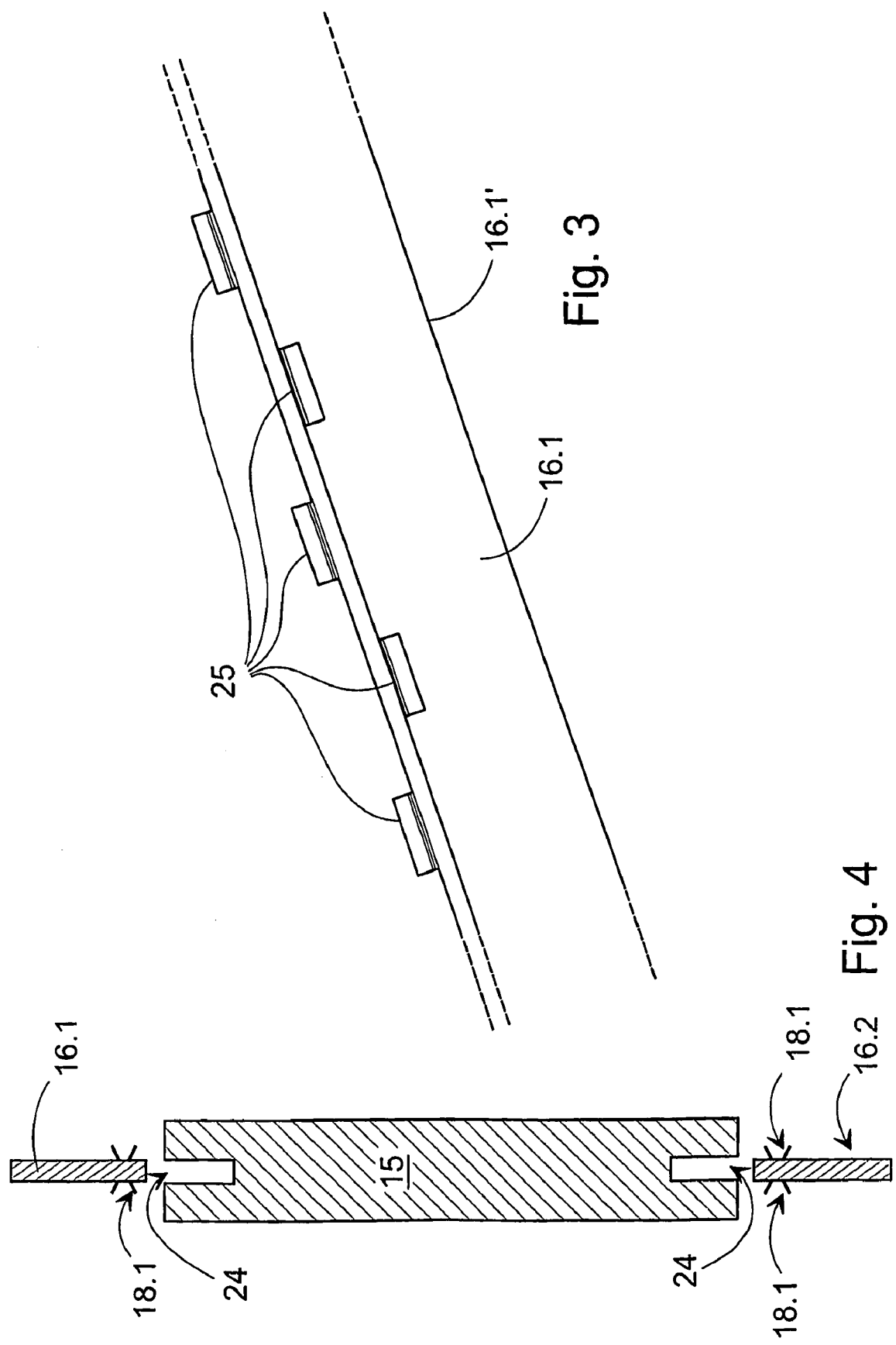

BLADE, STRUCTURAL COMPONENTS OF A BLADE, AND METHOD FOR MANUFACTURING A BLADE AND THE STRUCTURAL COMPONENTS OF A BLADE

BACKGROUND OF THE INVENTION

The present invention relates to a method for manufacturing a blade, in which
- at least the composite base structure of the blade is manufactured in a pultrusion process by pulling fibres through at least an impregnation stage and a curing stage,
- the base structure is equipped with at least one wear area, and
- the said blade is detached from a blade blank formed of a base structure and a wear area.

In addition, the invention also concerns a blade manufactured according to the method, structural components of a blade, and their manufacturing methods.

Nowadays, composite blades are used in, for example, in doctors of paper machines. The base materials of the blades can be, such as, for example, a polymer material, such as a thermoset or a thermoplastic. One or more fibre reinforcements may have been added to the polymer structure, such as, for example, carbon, glass, and/or boron fibres and/or other continuous fibres, such as, for example, metal fibres. The orientation of such fibres can be used to give elongated blades excellent strength and stiffness. The fibres are bound to a polymer matrix, so that together they form a plate-like and rigid composite structure.

One advantage of composite blades is that they combine lightness with good strength and a gentle effect on the roll surface being doctored, without this detracting, however, from their doctoring power.

Finnish patent FI-101637 (PCT publication WO-99/12726 A1) discloses one form of the prior art relating to composite blades. It presents a doctor blade manufactured using a pultrusion method, in which grinding particles are combined with the fibre reinforcement. These are used to achieve a cleaning and servicing effect on the object being doctored. The servicing layer, in which the grinding particles are incorporated, can be formed by bringing it into contact with carbon fibres, for example, by impregnating a carbon-fibre fabric with a matrix agent. The grinding particles can be along at least one edge of the blade, which then forms the wear area, the 'work edge' of the blade.

Another form of the prior art is disclosed in Finnish patent application FI-981312 (PCT publication WO-99/64674 A1). In it, the blade is also manufactured from a composite material, for example in a pultrusion process, while the surface of the wear area is given a ceramic coating. The ceramic is attached by an anchor structure to the surface of the composite. The anchor structure is attached throughout to the composite. A ceramic coating is manufactured to the surface of the composite, for example, with the aid of thermal spraying or some other suitable process. The process of making the coating takes place essentially separately from the actual pultrusion process. This complicates the production of blades.

A third example of composite blades is disclosed in U.S. Pat. No. 4,549,933.

At present, blades structures like those described are pulled through the pultrusion process, for example, with the aid of glass-fibre reinforcements which are cast into the base structure of the blade in the pultrusion process. Arranging reinforcements purely for the purpose of pulling increases the manufacturing costs of a blade. In addition, the working tolerance of the blade remains quite limited, as the grinding particles are bound to the base structure of the blade i.e. to the carbon-fibre composite, which wears easily, or because the thickness of the ceramic coating anchored to the composite is otherwise limited.

SUMMARY OF THE INVENTION

The present invention is intended to create a method for manufacturing a composite blade, a blade made according to a corresponding method, the structural components of a corresponding blade, and methods for manufacturing the structural components.

According to a first embodiment, in the manufacturing method according to the invention, when the blade blank is formed, an edge-structure part, which forms its own separate piece relative to the base structure, is attached to the composite base structure of the blade. This edge-structure part protruding clearly from the edge of the base structure at right angles relative to the longitudinal axis of the blade i.e. in the transverse direction of the blade, can form in a ready blade, detached from the blade blank, at least one of the wear areas being in the blade.

According to one preferred embodiment, the fibres, or in general the blade blank can be pulled through the pultrusion process by an edge-structure part protruding from the base structure, if the edge structure part is attached to the base structure already during the pultrusion process itself. Thus the edge-structure parts protruding outside the edges of the composite part can be protrudingly cast into the base structure of the blade, even on both sides of it. Owing to this the need for special pulling fibres to be cast into the composite will eliminates, from which a blade blank formed in a process is pulled through the pultrusion process according to the prior art. Pulling by the edge strips will also improve the stability of the orientation of the fibres.

Another way to make a blade according to the invention is to attach the edge-structure part afterwards to the base structure of a blade that has been made in a pultrusion process. In any event, in both manufacturing methods is formed a blade, in which the edge-structure part is cast into the base structure, thus forming a reinforced-plastic structure.

A two-sided edge-structure part attached to a base structure also permits surprisingly versatile use for the blade. The same blade can now be used even twice. Thus the blade can be reversed, once the wear tolerance of one edge has been used up. On the other hand, during the manufacture of the blade, the blade blank can also be split in two along the direction of its longitudinal axis. This will give two blades, with two different types of wear edge, from a single piece of appropriately dimensioned blank. One of the blade's working edges will then be equipped with a special edge-part structure while the other edge will be of the composite base material. Thus the same blade can even be used in different doctoring positions, once the wear tolerance of one edge has ended.

According to one embodiment, special bonds can be arranged in the edge-structure part. These can be used to ensure the adhesion of the edge-structure part cast to the base structure and protruding outside its edge, in the base structure of the blade itself. According to one embodiment, the bonds can be made such that the impregnating agent can penetrate through the edge-structure part at points corresponding to the bonds. Using such a three-dimensional bond will securely attach the edge structure to the actual base structure and improve the casting effect. The bonds can also be grouped so as to create a sufficient bond strength in all directions. This can also help to influence the nature of the individual bonds relative to each other in the bond group they form.

Other characteristic features of the invention will become apparent from the accompanying Claims while further other advantages achieved by the invention are referred to in the description portion.

BRIEF DESCRIPTION OF THE DRAWINGS

The invention, which is in no way restricted to the embodiments described in the following, is examined in greater detail with reference to the accompanying drawings, in which FIGS. 2a and 2b show a blade manufactured according to the invention, as an example of an application, seen from different directions, FIG. 3 shows another example of the bonds in the edge strip, FIG. 4 shows another example of a composite base structure, for manufacturing a blade according to the invention.

DETAILED DESCRIPTION OF THE INVENTION

Figure 1:
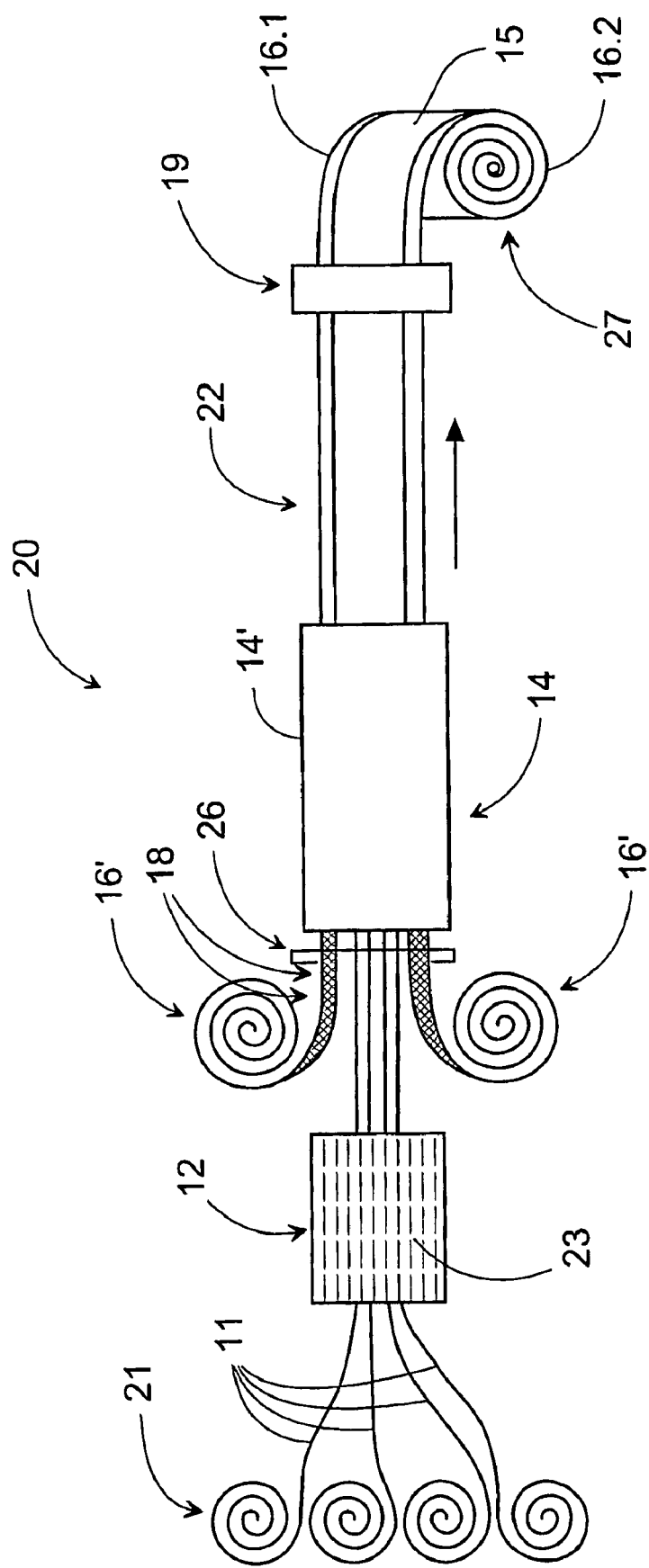
FIG. 1 shows a rough schematic diagram of one example of the manufacturing method according to the invention.

FIG. 1 shows one example of the method according to the invention, for manufacturing a composite blade 10. The blade 10 according to the invention is made at least partly using pultrusion technology, in a process 20 that is also known as die pultrusion. As such, to one versed in the art, pultrusion 20 is a conventional technique, so that there is no need in this connection to depict it in particularly great detail.

However, in the pultrusion process 20, fibres/a fibre mat 11 is pulled through the basic stages characteristic of the pultrusion method, resulting in a blade blank 22, which is either straight or can be reeled onto a reel 27, from which blades 10 can be detached. The fibres 11 can be, for example, carbon fibre and/or glass fibres and/or aramid fibres and/or boron fibres, this being in no way limited by the basic idea of the invention. Examples of the ratios forming a composite consisting of, for example carbon fibre and glass fibre, are 40/60 and even more generally 35/65. The composite can have arbitrary fibre orientation. According to one embodiment, the glass-fibre layers can be oriented, for example, parallel to the longitudinal axis of the blade 10, while at least some of the layers containing carbon fibre can deviate from the direction of the longitudinal axis of the blade 10.

The blade blank 22 consists of a rigid shape-profile base structure 15 with several fibre layers in the form of a reinforced-plastic structure, which is equipped with at least one wear area 16.1, 16.2. In FIG. 1 the pulling direction of the blank 22 is shown by an arrow. Of the stages of the process 20, in this connection reference can be made to at least an impregnation stage 12 and curing stage 14.

The fibres 11 can be arranged in a preset battery of several reels 21. From there, guides (not shown) are used to lead them first of all to the impregnation stage 12. There, the fibres 11 are impregnated with an excess of some selected matrix agent 23, such as, for example, a polymer material. Examples of these can be said fluoridized thermoset, thermoplastic, or (epoxy) resin. Reference can also be made to resin with additives, in which the resin can be, for example, filled with nanoparticles. Impregnation is carried out to an excess, the excess flowing off already during the impregnation stage 12. Impregnation 12 is followed by the actual die pultrusion, i.e. the curing stage 14.

In pultrusion 14, the fibres 11 impregnated with polymer 23 are pulled through a die 14' of a chosen kind. A set temperature and pressure effect is also associated with pultrusion 14. As a result of these, the polymer 23 hardens and gains strength, while the fibres 11 stiffen into the desired shape defined by the die 14'. The curing stage 14 is a chemical reaction of a kind that is, as such, known to one versed in the art, which can be created in zones with differing temperatures/pressure effects, the arranging of which will be obvious to one versed in the art. Final curing can also be performed as post-curing, for example, in a post-curing autoclave (not shown).

The finished blade blank 22, which is, for example, reeled on a reel 27 or is straight, is pulled using pulling means 19. The pulling means 19 can consist of, for example, a nip consisting of at least two rollers, through which the blade blank 22 travels to the reel 27. In the case of the narrowest type of blade, 100-150 meters of blade blank 22, for example, can be reeled on the reel 27, after which it can be changed. Finished blades 10 can be detached from the blank 22, for example, by cutting them to the customer size in a later stage, or alternatively also instead of reeling. The process described above can be varied in many different ways.

In the manufacturing process 20 according to the invention, at least one of the wear areas of the blade 10 is formed from an independent edge-structure part 16.1, 16.2, which in this case is attached to the composite base structure 15 already during the pultrusion process 20. The result of the process 20 is a surprising sheet-laminate hybrid blade, in which, in the same continuous pultrusion process 20, are simultaneously formed both the composite base structure 15 and the edge-structure part 16.1, 16.2 intended to wear that is integrated, for example by lamination, and that is protruding outside the edge of the actual base structure 15. The edge-structure part 16.1, 16.2, or at least its point 16.1', 16.2' can be equipped with a wear-resistant treatment, or a coating, which can be implemented, for example, using methods according to the prior art. A surprising feature of this it may not be necessary to further process the blade blank 22 obtained as a result of the pultrusion process 20 in order to create special wear-resistant areas, but instead these can be already in the edge strip 16.1, 16.2 itself, which is attached to the composite 15 by casting. This is an obvious advantage of the manufacturing technique.

In the embodiment according to FIG. 1, an edge strip 16.1, 16.2 is attached to both sides of the base structure 15 in the pultrusion process 20. The strips 16.1, 16.2 are introduced to the process flow from coils 16'. Depending on the material of the strips 16.1, 16.2, they can also be impregnated with a polymer material 23. This applied especially in the case of a composite strip. Before the actual curing stage 14, the strips 16.1, 16.2 are positioned from the entry side 26 of the die 14' relative to the fibres 11, in such a way that they become integrated with the fibre-reinforced composite 15 to form a single entire blade blank 27 and form a structure protruding outside the edge of the composite 15 in the lateral direction of the composite. In other words, edge strips 16.1, 16.2, possibly treated with a polymer material 23, as well as fibres 11 impregnated with a polymer material 23 are both fed into the die 14', in which die 14' the strips 16.1, 16.2 are then cast, over part of their width and over their entire length, onto the composite base structure 15, for example, to both of its edges. The casting is performed in the die 14', in which space is available for the strips 16.1, 16.2.

The attachment of edge strips 16.1, 16.2 on both sides relative to the actual composite base structure 15 achieves a surprising advantage in terms of manufacturing technique, that the blade blank 22, i.e. in practice the polymer-impregnated fibres 11, can be pulled through the pultrusion process 20 by these edge-structure parts 16.1, 16.2 protruding outside it in the lateral direction of the base structure 15. Pulling performed using the strips 16.1, 16.2 improves the stability of the orientation of the fibres. Strip pulling eliminates the need for actual pulling fibres/strings. On the other hand, pulling fibres too, integrated with the composite 15 or the strip 16.1, 16.2, can still be used if so desired. The pulling strings can then, for example, be arranged in the working tip 16.1', 16.2' of the strip 16.1, 16.2, where the wear-resistant coating/treatment is. The strings then also act to shield the working tip 16.1', 16.2'.

In order to permit pulling, the pulling means 19, consisting of a nip of rollers on top of each other, of which nips there can be several one after the other, can be arranged, in the direction of their longitudinal axis, to be such as that it is possible to support the pulling to the edge strips 16.1, 16.2 being on both edges of the base structure 15. In that case, the rollers can be shaped in zones according to the thickness of the profile being manufactured, so that the main pulling compression acts on the strips 16.1, 16.2. Such a set of pulling rollers 19 is also possible, in which there are two parallel nips for the strips 16.1, 16.2 protruding from both edges of the base structure 15. There are also diverse possibilities for implementing the pulling 19. Examples of the dimensions of the edge strips 16.1, 16.2 are given a little later.

Some, but of course in no way limiting examples of the possible materials for the strips 16.1, 16.2 are a plastic strip in a band form, a metal strip, composite, ceramics, or glass. The fibre orientations in the longitudinal and transverse directions of composite strips can be arbitrary. In addition, the angles of the fibres can deviate from each other. The composite forming the edge strips 16.1, 16.2 can have properties of extreme heat resistance (an operating temperature of, for example, 400 C) compared to the composite of the base structure 15 (operating temperature, for example, 200 C). This can make its price even many times that of the composite forming the base structure 15, so that it is sensible to use it in the wear areas.

The strips 16.1, 16.2 can be treated in such a way that to their surface is brought a ceramic surface, a sintered surface, diamond surface, a noble metal surface, chrome surface, or some combination of these. Different kind of nitride, oxide, and carbide surfaces are also possible, as are heat-treated surfaces. The treatment or coating can be applied to the entire edge-structure part 16.1, 16.2, or to only the 'work point', i.e. the actual wear-tolerance area 16.1', 16.2' in contact with the object being doctored. In itself, the coating or the surface treatment of the edge strips 16.1, 16.2 is not intended to restrict the basic idea of the invention, but instead various kinds of coatings and treatments, which have been able to be made to the edge-band strip 16.1, 16.2 prior to the pultrusion process, will be obvious to one versed in the art. Of course, treatments and coatings can be made instead of, or along with pre-treatment even after the pultrusion process, if for some reason the situation requires this.

FIGS. 2a and 2b show one example of a composite blade 10 according to the invention, which has been obtained by detaching it from a blade blank 22. FIG. 2a shows a cross section of the blade 10 while FIG. 2b shows a side view of the piece of the blade 10. The blade 10 consists of a base structure 15 containing several fibre layers as a composite structure. The base structure 15 is equipped with at least one wear area 16.1, 16.2, which is laminated to it. Such a blade 10 can have been manufactured in the pultrusion process 20 according to the invention, in which the fibres 11 have been pulled through stages characteristic of the process, such as, for example, at least an impregnation stage 12 and a curing stage 14.

At least one of the wear areas of the blade 10 have been formed of an independent edge-structure part 16.1, 16.2, which is attached to the base structure 15, for example, during the pultrusion process 20 according to the invention. An edge-structure part 16.1, 16.2 is now attached to both edges of the base structure 15, which permits the fibres 11 to be pulled through the pultrusion process 20 without actual pulling fibres. In this embodiment, the edge strips 16.1, 16.2 with the base structure 15 form a quite sheet-like shape, so that they are flat in the longitudinal axis and in the width direction. Of course, the edge strip 16.1, 16.2 can be at a small angle relative to the composite base structure 15.

One example of the total width of a blade 10 according to the invention is 60-350 mm, such as, for example, 150-250 mm. In that case, the width of the edge strip 16.1, 16.2 can be 2-100 mm, such as, for example, 5-60 mm. The thickness of the material of the base structure 15 of the blade 10 can be 0.5-10 mm, such as, for example, 1-5 mm. In that case the thickness of the material of the edge strip 16.1-16.2 can be 0.1-6 mm, such as, for example, 0.2-4 mm. The penetration of the edge strip 16.1-16.2 to the base structure 15 can be, for example, 1-90% of the width of the base structure 15. From this penetration area, the edge strip 16.1, 16.2 is surrounded by the fibre layers of the base structure 15 on at least one side (asymmetric joint), or even on both sides, while from the other areas it protrudes from the edge of the base structure 15, being clearly separate from the actual base structure 15 itself. When doctoring, the heat due to friction is transferred effectively, for example, from a metallic edge strip 16.1, 16.2 to the fibre composite 15, which effectively conducts the heat away from the work point 16.1', 16.2' of the blade 10 to elsewhere in the blade 10.

According to one embodiment, bonds 17.1-17.8, or at least some form of anchoring, can be arranged in the edge strips 16.1, 16.2 of the blade according to the invention. These are intended to ensure the cast joint between the edge strips 16.1, 16.2 and the base structure 15. The inset of FIG. 2b shows a first example of a manner of arranging the bonds 17.1-17.8.

The bonds 17.1-17.8 can be arranged, for example, in connection with the coiling of the edge strips onto a coil 16', when manufacturing it, or only once the edge strip 16.1, 16.2 is fed to the pultrusion process 20. If the dimensions/shapes/arrangement of the bonds 17.1-17.8 in the edge strip 16.1, 16.2 vary, for example, on the basis of the blade blank 22 being made at the time, then in that case it is possible to use an edge strip 16.1, 16.2 of a set dimension in the manufacture of several types of blade, if its dimensions and properties otherwise permit this. The anchorages 17.1-17.8 itself can then be made before the strip 16.1, 16.2 is fed to the pultrusion process 20, in which case the edge-strip blank 16' can be otherwise already in its final form. In order to create a continuous and undisturbed pultrusion process, it would appear that an edge strip 16.1, 16.2 that is prefabricated already in its final form, i.e. one that is equipped with bonds 17.1-17.8 is the most advantageous form of implementation. It should be noted that the invention also relates to edge-strip blanks 16' equipped with bonds 17.1-17.8, by which the strip 16.1, 16.2 can be led into, for example, the continuous pultrusion process 20, in order to manufacture a blade 10 according to the invention.

In addition to the bonds 17.1-17.8 ensuring the joint between the edge strip 16.1, 16.2 and the base structure 15, they also form a three-dimensional space for the impregnating agent 23, which impregnating agent 23 the edge strip 16.1, 16.2 being fed to the process can also be impregnated prior to its being led to the pultrusion die 14' together with the composite 11, 23.

One example of creating the bonds 17.1-17.8 is stamping. Roughening can also become into question for creating the bonds besides, or in place of stamping, but a clear 3D formation given to the strip 16.1, 16.2 by stamping will, however, create a better penetration/retention of the impregnation agent 23 in the strip 16.1, 16.2 while simultaneously also forming a real mechanical anchor to ensure the cast joint between the edge structure 16.1, 16.2 and the base structure 15. The use of roughening by itself may not necessarily achieve sufficient anchoring/penetration space for the impregnation agent/fibres, because the thermal expansion of the composite 15 is sufficiently different to that of, for example, a metallic edge strip 16.1, 16.2. Thus thermal expansion may cause weakness in the joint, which may result in the blade breaking up, for example, when in use. If the stamping is performed immediately prior to the strip 16.1, 16.2 being led to the pultrusion process 20, stamping means (not shown) will also form part of the pultrusion process 20.

If the strip 16.1, 16.2 is of composite, for example, it will then be possible to impregnate it with a polymer material 23. If the strip 16.1, 16.2 is dipped in the impregnating agent 23 in stage 12, its surface will become impregnated over the desired area. The impregnated area can be, for example, precisely the area that is cast together with the composite base structure 15 in stage 14. In connection with soaking, a great deal of the impregnating agent 23 will also adhere to the bonds 17.1-17.8, where it will remain attached thanks, among other things, to its surface tension and the advantageous shape of the bonds 17.1-17.8.

The bonds 17.1-17.8 can form of symmetrical groups of bonds 18.1-18.3 at a distance from each other. One example of the distance between the groups is 3-1000 mm, such as, for example 5-300 mm. According to one embodiment, the bonds 17.1-17.8 belonging to the groups 18.1-18.3 can form an asymmetrical arrangement when examined from one side of the strip 16.1, 16.2, in which pairs of counter bonds (for example, 17.1, 17.5) are on opposite sides of the strip 16.1. Such an arrangement can be used to increase the strength of the joint between the strip 16.1, 16.2 and the base structure 15. In order to group the bonds 17.1-17.8 at a set distance from each other, the stamping machine is programmed to make them discretely, taking into account the speed of travel of the strip 16.1, 16.2 in the stamping machine/pultrusion.

According to one embodiment, the groups 18.1-18.3 of bonds 17.1-17.8 can form a star pattern. Other patterns can also be considered. In such a star pattern 18.1-18.3, there are also stamped attachment wings 17.1, 17.3, 17.5, 17.7, corresponding to the intercardinal points of the compass, between four attachment wings 17.2, 17.4, 17.6, 17.8 corresponding to the four cardinal points of the compass. The stamping is two-sided, so that it can be carried out alternately on both plate sides of the strip 16.1, 16.2. As a result of this, every second stamp can form a concave cup on a side of the strip 16.1, 16.2 and every other stamp a convex cap. An example of the diameter of the cup/cap is 1-15 mm, such as, for example, 2-10 mm. Because in the stamping the edge structure 'punches' part of the edge of the cup and cap, this offers an even better adhesion/penetration hole for the impregnation agent 23.

As a result of the punching, the impregnation agent 23 brought to one side of the strip 16.1, 16.2 makes contact with the impregnation agent 23 brought to the other side of the strip 16.1, 16.2, through the punched points. This further reinforces the joint, because from this point that is pierced by punching the impregnation agent 23 forms a 'spike' through the strip 16.1, 16.2. Additional strengthening of the joint between the strip 16.1, 16.2 and the composite 15 is also provided by the fact that once hardening the impregnation agent 23 that has adhered already to the actual adhesion cups 17.1-17.8 in stage 12 forms a bump that holds the strip 16.1, 16.2 in its place.

FIG. 3 shows a second example of the implementation of the bonds 25. In FIG. 3, the strip 16.1 is shown when examining it as an axial image. The bonds 25 now are formed of bends 25 made in the edge of the strip 16.1 to be cast into the composite 15.

The bends 25 can be at a distance from each other in the direction of the longitudinal axis of the strip 16.1 and they can point alternately to opposite sides of the strip 16.1. The length of the bends 25 in the direction of the longitudinal axis of the strip 16.1 can be, for example, 10-100 mm and the distance between the bends 10-100 mm. The bends 25 can follow each other immediately, or there can be an unbent protection area between them, as in the case shown by FIG. 3.

The angle of a bend 25 relative to the flat-plate basic character of the strip 16.1 can be 90 degrees, or even greater. In that case, the bend can be formed using a sharp turn-up, when it will form a hook-shaped 'catch' that firmly holds the strip 16.1 to the composite base structure 15.

Also various wave shapes, (for example, sine waves, saw-shaped, or square shaped) can be some examples of the bonds. In general it is possible to refer to formations, which lead to a deviation from the flat and plate-like basic character of the strip 16.1, 16.2.

The use of a bond-arrangement positioning the edge structure 16.1, 16.2 to the composite 15 has been achieved extremely high strength in all directions, so that the edge strip 16.1, 16.2 is sure to remain secure in the composite base structure 15. This permits particularly the embodiment shown in FIGS. 2a and 2b. This is important in terms of the durability of the blades 10, because blades that flex in the direction of the longitudinal axis are very long when handled and are loaded at their points of use. Thus stresses appear in every direction in the blade 10. By means of the composite 15 and the strip 16.1, 16.2 attached to it, a blade 10 that is very flexible in the direction of its longitudinal axis is achieved, as well as the stiffness required in the direction of the width of the blade, both of which are important in maintaining a doctor contact over the entire length of the roll being doctored.

FIG. 4 shows a second embodiment in order to manufacture a blade 10 according to the invention. In this case, the strip 16.1, 16.2 is not attached to the base structure 15 in connection with the continuous pultrusion process 20, instead this takes place as a post-operation. Now in the pultrusion process 20 only a continuous composite shaped-profile base structure 15 is made, to which as a method and base structure of a blade 10 the invention also concerns. Now in the die 14' there are shapes, by means of which a recess 24 or more generally a place for the edge-structure part 16.1, 16.2 is formed in the base structure 15, in both of its edges. The strip 16.1, 16.2 can be attached to this recess 24 after the pultrusion process 20.

The attachment can be performed, for example, in such a way that a strip 16.1, 16.2 equipped with bonds 17.1-17.8 is placed in the groove 24 formed for it in the edge of the base structure 15, after which the strip 16.1, 16.2 can be arranged to act as an electric resistance. An electric current led to the strip 16.1, 16.2 raises its temperature to the operating temperature of the matrix agent. This causes the strip 16.1, 16.2 to melt onto the composite base structure 15 while at the same time a strong cast bond is formed between them, which the bonds 17.1-17.8 reinforce. In the case of thermoplastic, this can be called melting while in the case of thermoset it can be referred to as the resin penetrating into/adhering to the shapes of the strip 16.1, 16.2. In any case, the matrix agent 23 of the composite melts and takes the shape of the possible bond shapes of the strip 16.1, 16.2. When the electro-melting is terminated, the matrix agent hardens and the result is that the strip 16.1, 16.2 is firmly cast into the actual base structure 15. This post-attachment of the strip 16.1, 16.2 to the base structure 15 brings the advantage of, among other things, eliminating possible differences in thermal expansion between the base structure 15 and the strip 16.1, 16.2, if both are of a composite material, for example. According to the embodiment, the equipping of the base structure 15 with at least one wear area can take place already in the pultrusion process 20 (on-line), or only after it (off-line). It is also possible to glue the strip 16.1, 16.2 to the base structure 15.

Figure 5:
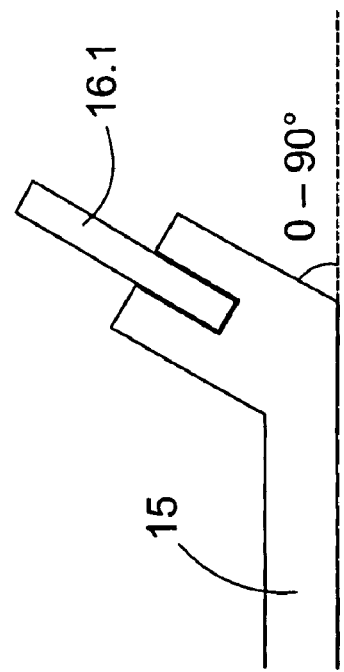
FIG. 5 shows a third example of a composite base structure, for manufacturing a blade according to the invention

In the embodiments described above, the base structure 15 of the blade 10 has been a shaped profile, which is plate-like, i.e. essentially without corners. Within the context of the invention, the term 'shaped profile' can be understood very widely, so that the base structure 15 can also deviate from one that is a flat plate throughout. FIG. 5 shows a second example of an application of a composite base structure 15 consisting of a shaped profile. In it, the base structure's 15 edges, from which the edge strips 16.1, 16.2 protrude from the base structure 15, are at a selected angle relative to the flat plate-like central part of the base structure 15. The angle α can be, for example, 0-90. The angle α can be in one edge of the base structure 15, or in both of its edges. The use of a shaped profile structure of this kind achieves advantage in, among other things, the control of the travel of the web.

Figure 6B:
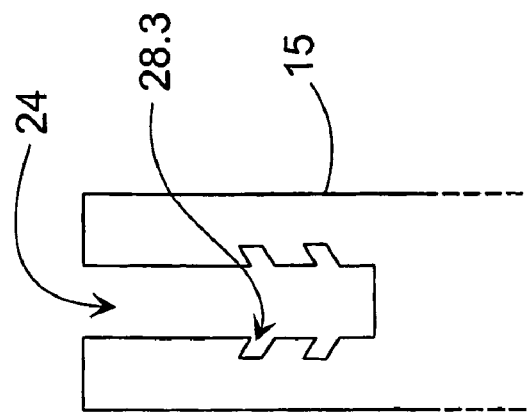
FIGS. 6a and 6b show some additional examples of the arrangement of bonds in the edge strip and the base structure.
Figure 6A:
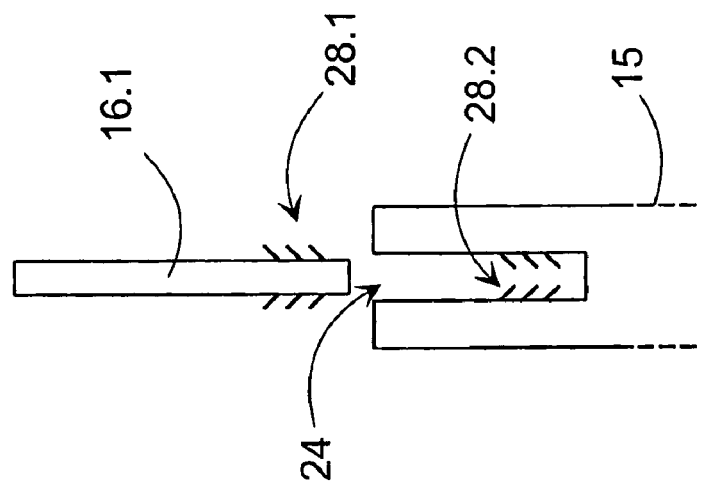

FIGS. 6*a* and 6*b* show yet another embodiment of the implementation of the bonds. In FIG. 6*a*, there are opposing claws 28.1, 28.2 in both the edge structure 16.1 and the base structure 15, which ensure that the edge structure 16.1 will remain firmly in the base structure 15, once the edge structure 16.1 has been pushed into the deep groove 24 of the base structure 15. In FIG. 6*a*, the claws 28.2 of the base structure 15 face into the groove 24. In FIG. 6*b*, there are internal shapes 28.3 in the groove 24, the corresponding of which external shapes can be in the edge structure too. The type of edge structure shown, for example, in FIG. 3 can be applied to this base structure.

It is possible to make blades 10 for several different operating positions, from a blade blank 22 manufactured in the manner according to the invention,. Besides the blade 10 being able to be used as a doctoring and cleaning blade in a paper or board machine, it can also be applied in coating machines/devices, in pulp machines, in printing machines, in tissue machines, or in general in applications relating to web formation, papermaking, and closely related fields and finishing/processing points, in which doctoring is performed for one or more purposes. The blade 10 can be further used in the aforementioned machines as a cleaning blade maintaining runnability and the quality of the paper, and/or as a servicing blade, in which the surface being doctored is serviced (for example, ground/polished) by the blade, in order to maintain the original state of the roll, or to achieve it. In the case of a cleaning blade, undesirable substances that have adhered to the surface of the roll are removed from it. In addition, a fibre-reinforced reinforced plastic composite blade 10 equipped with the edge structure 16.1, 16.2 according to the invention is also suitable for use as a paper-web transfer doctor.

For example, in coating-device applications arranging a wear-resistant tip 16.1', 16.2' in the strip 16.1, 16.2 is of great importance. Even a small amount of wear in the tip 16.1', 16.2', which results in a change in the angle of contact between the blade 10 and the surface being doctored, will immediately affect the amount of coating remaining on the surface. The surface can be, for example, a coating roll, or the web being coated, depending on the manner of coating. This, in turn, will directly affect the quality of the paper being coated. According to the prior art, blades have had to be changed in coating devices at intervals of even only a few hours. Thus a wear surface that is permanently made in the wear area of the strip 16.1, 16.2 will increase the useful operating time of the blade 10, because by using it the amount of coating on the roll/web can be made to remain as stable as possible for a long time.

At its simplest, the blade 10 can be detached from the blade blank 22 by cutting off a set length it from a reel 27. The edge-strip structure 16.1, 16.2 will then consist of two wearing edges 16.1', 16.2' in the blade 10, which permit its use as a reversible blade. When one edge 16.1' of the blade 10 is completely worn out, the blade 10 can be reversed and the other edge 16.2' used. Once both edges 16.1', 16.2' have worn out, the blade 10 can surprisingly still be split in the middle along its longitudinal axis (the broken line in FIG. 2*a*). This will provide still two identical blades, the split face of which, i.e. the composite base structure 15 of the blade 10 forms a work area intended to be a wearing blade part. Such a blade can be used as a normal doctor blade, for example, in some 'soft' roll position, in which precisely composite blades are generally favoured.

The use of an edge structure 16.1, 16.2 protruding outside the edge of the composite 15, in turn achieves a reduction in the wear of the composite base structure 15. Generally too, the edge structure 16.1, 16.2 is more resistant to wear than the composite base structure 15.

According to a second embodiment, the blade 10 can be already directly split along the broken line shown in FIGS. 2*a* and 2*b*, in connection with detaching from the blade blank 22. The splitting can be performed in such a way as to create a work point of the desired kind. Thus immediately originally two identic blades is obtained that is equipped with two different kinds of work areas. One work area will now have a strip while the other work area will be of the base structure 15. The possible applications for the use of the blade 10 are surprisingly diverse.

Retaining elements and/or shapes (not shown), which remain in the gap of the blade holder and prevent the blade 10 from dropping out of the holder, can be arranged in ways that are, as such, known, in the opposite edge to the blade's 10 work edge 16.1', 16.2' at any time, either in the base structure 15 and/or in the edge part 16.1, 16.2.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one versed in the art.

The invention claimed is:

1. Method for manufacturing a blade, in which at least a composite base structure of the blade is manufactured in a pultrusion process, which comprises pulling fibres through at least an impregnation stage and a curing stage, equipping the base structure with at least one wear area, and detaching the said blade from a blade blank formed of a base structure and a wear area, wherein the wear area is formed of an edge-structure part protruding outside the edge of the base structure, and wherein the edge-structure part is separately attached to the base structure in the curing stage of the pultrusion process.

2. The method according to claim 1, wherein an edge-part structure is attached to both edges of the base structure and the pulling of the fibres through the pultrusion process takes place from the edge part structures.

3. The method according to claim 2, wherein bonds are arranged in the edge-structure parts, in order to ensure the joint between the edge-structure parts and the base structure.

4. The method according to claim 1, wherein bonds are arranged in the edge-structure parts, in order to ensure the joint between the edge-structure parts and the base structure.

5. The method according to claim 4, wherein from the bonds are formed groups, by means of which the bonds belonging to the group are formed in a symmetric pattern, in order to increase the strength of the joint between the edge-structure part and the base structure.

6. A method of manufacturing, in a pultrusion process, a blade having a composite base structure provided with at least one lateral edge structure forming a wear area, which comprises pulling fibres through an impregnation state to form a base structure, introducing said edge structure together with said base structure into the curing stage, where the edge structure is laterally attached to extend from the base structure, forming a blade blank, and detaching the blade from the blade blank.

7. The method of claim 6, wherein the edge structure is laterally attached to both side edges of the base structure and the pulling of the fibres and base structure through the pultrusion process is concentrated through the edge structures.

8. The method of claim 6, wherein bonding means are provided in the edge structure to ensure the connection strength between the edge structure and the base structure.

9. The method of claim 6, wherein the edge structure is attached to the base structure by lamination or casting.

10. The method of claim 6, wherein the edge structure penetrates into the base structure in an amount of from 1-90% of the width of the base structure.

* * * * *